(12) United States Patent
Chiu (10) Patent No.: US 8,393,840 B2
(45) Date of Patent: Mar. 12, 2013

(54) FLOATING FASTENER

(75) Inventor: Ming-Chung Chiu, New Taipei (TW)

(73) Assignee: Hanwit Precision Industries Ltd., New Taipei (TW)

( * ) Notice: Subject to any disclaimer, the term of this patent is extended or adjusted under 35 U.S.C. 154(b) by 274 days.

(21) Appl. No.: 12/929,551

(22) Filed: Feb. 1, 2011

(65) Prior Publication Data
US 2012/0195711 A1 Aug. 2, 2012

(51) Int. Cl.
*F16B 21/18* (2006.01)
(52) U.S. Cl. .......................................... 411/353; 411/357
(58) Field of Classification Search .................. 411/353, 411/356, 357, 107
See application file for complete search history.

(56) References Cited

U.S. PATENT DOCUMENTS

| 4,930,371 A * | 6/1990 | Schneider ........................ 74/527 |
| 5,586,852 A * | 12/1996 | Ganter .......................... 411/353 |
| 6,746,058 B2 * | 6/2004 | Kienzler ........................ 292/175 |
| 7,198,306 B2 * | 4/2007 | Ambs ............................ 292/175 |
| 7,922,432 B2 * | 4/2011 | Chiu ............................. 411/107 |

* cited by examiner

*Primary Examiner* — Gary Estremsky
(74) *Attorney, Agent, or Firm* — Bacon & Thomas, PLLC (57) ABSTRACT

A floating fastener includes a base member, a limiter block fastened to one end of the base member and defining an elliptical constraint hole, a locking rod inserted through the non-circular constraint hole of the limiter block and having an annular groove extending around the periphery of the non-circular rod body thereof, a spring member sleeved onto the locking rod and stopped between a stop flange of the locking rod and the limiter block, and a knob fastened to one end of the locking rod and disposed outside the base member and operable to move the locking rod axially relative to the base member and to rotate the locking rod, when the locking rod is moved to the elevation where the annular groove of the locking rod is kept in the non-circular constraint hole of the limiter block, between a constrained position where the locking rod is stopped by the limiter block from axial movement relative to the base member and a released position where the locking rod is released from the constraint of the limiter block and movable axially relative to the base member.

9 Claims, 10 Drawing Sheets

FIG.10

FLOATING FASTENER

BACKGROUND OF THE INVENTION

1. Field of the Invention

The present invention relates to floating fasteners for joining metal board members and more particularly, to a floating fastener including a base member and a locking rod set consisting of a locking rod, a spring member, a limiter block and a knob, which facilitates mounting and dismounting without causing obstruction, and avoids missing of component parts.

2. Description of the Related Art

Screw members and pins are commonly used in our daily life to temporarily locking movable devices in position. For example, when moving a sliding box or a board member of a machine case to a predetermined position, a screw member or pin may be used to temporarily lock the sliding box or board member in position for allowing the user to perform certain tasks. Further, screw members and/or pins are intensively used in desk computers, notebook computers, industrial computers, workstations to detachably fasten board members together.

When fastening or unfastening a screw member or a pin, the user may be injured by the tip of the screw member or pin accidentally. Further, screw members and/or pins may be missed somewhere when removed from board members. Further, if different sizes of screw members and/or pins are stored in one same storage device or place, the user may have to spend a lot of time to pick up the desired size of screw members and/or pins from the storage device for application. Further, a special hand tool (screwdriver or spanner) must be used when mounting or dismounting screw members and/or pins, complicating the mounting or dismounting operation.

SUMMARY OF THE INVENTION

The present invention has been accomplished under the circumstances in view. It is therefore an object of the present invention to provide a floating fastener, which facilitates mounting and dismounting without causing obstruction, and avoids missing of component parts.

To achieve this and other objects of the present invention, a floating fastener comprises a base member, a limiter block mounted in an accommodation chamber in one end of the base member and defining a non-circular constraint hole, a locking rod axially slidably inserted through the base member and the non-circular constraint hole of the limiter block and having an annular groove extending around the periphery of the non-circular rod body thereof, a spring member sleeved onto the locking rod and stopped between a stop flange of the locking rod and the limiter block, and a knob fastened to one end of the locking rod and disposed outside the base member and operable to move the locking rod axially relative to the base member and to rotate the locking rod, when the locking rod is moved to the elevation where the annular groove of the locking rod is kept in the non-circular constraint hole of the limiter block, between a constrained position where the locking rod is stopped by the limiter block from axial movement relative to the base member and a released position where the locking rod is released from the constraint of the limiter block and movable axially relative to the base member.

Further, the locking rod comprises two longitudinal cut planes located on the periphery of the non-circular rod body at two opposite sides, and two arched surface portions located on the periphery of the non-circular rod body at two opposite sides and spaced by the longitudinal cut planes. The annular groove of the locking rod extends around the periphery of the non-circular rod body on the middle across the arched surface portions and the longitudinal cut planes. Further, the non-circular constraint hole of the limiter block is an elliptical hole having a major axis and a minor axis and two cut planes disposed at two opposite sides in a perpendicular manner relative to the minor axis and in a parallel relationship relative to the major axis and fitting the longitudinal cut planes of the locking rod.

Further, the base member has a tapered end portion surrounding the accommodation chamber. The knob has a screw rod threaded into a screw hole on one end of the non-circular rod body of the locking rod. Thus, an inwardly curved gripping space is defined around the tapered end portion of the base member and the periphery of the knob to facilitate the user's grip.

In an alternate form of the invention, the floating fastener comprises a base member having a non-circular constraint hole on one end wall thereof, a locking rod axially slidably inserted through the non-circular constraint hole of the base member and having an annular groove extending around the periphery of the non-circular rod body thereof, a spring member sleeved onto the locking rod and stopped between a stop flange of the locking rod and the end wall of the base member, and a knob fastened to one end of the locking rod and disposed outside the base member and operable to move the locking rod axially relative to the base member, and to rotate the locking rod, when the locking rod is moved to the elevation where the annular groove of the locking rod is kept in the non-circular constraint hole, between a constrained position where the locking rod is stopped by the end wall of the base member from axial movement relative to the base member and a released position where the locking rod is released from the constraint of the end wall of the base member and movable axially relative to the base member.

DETAILED DESCRIPTION OF THE PREFERRED EMBODIMENT

Figure 1:
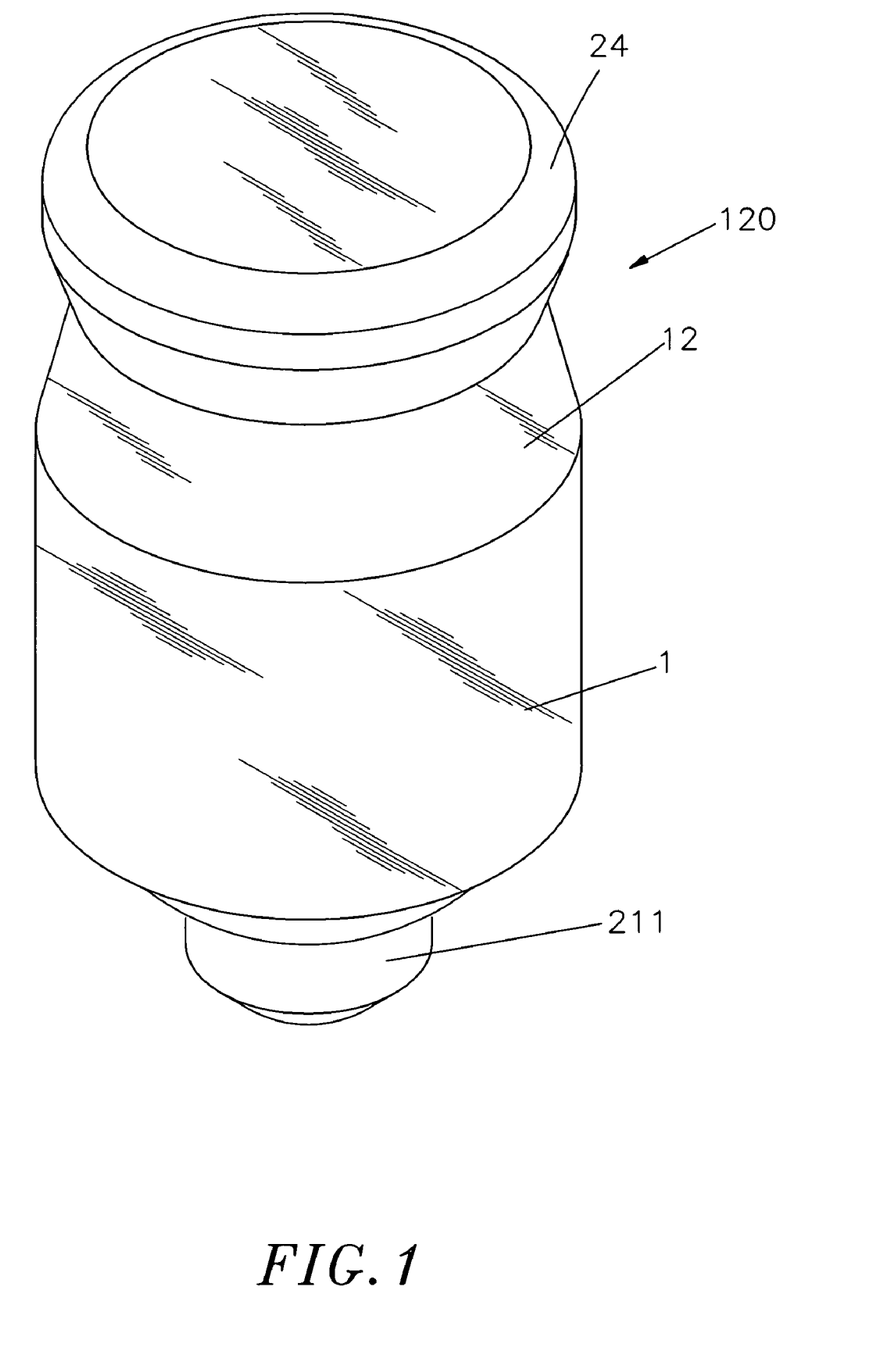
FIG. 1 is an elevational view of a floating fastener in accordance with a first embodiment of the present invention.
Figure 2:
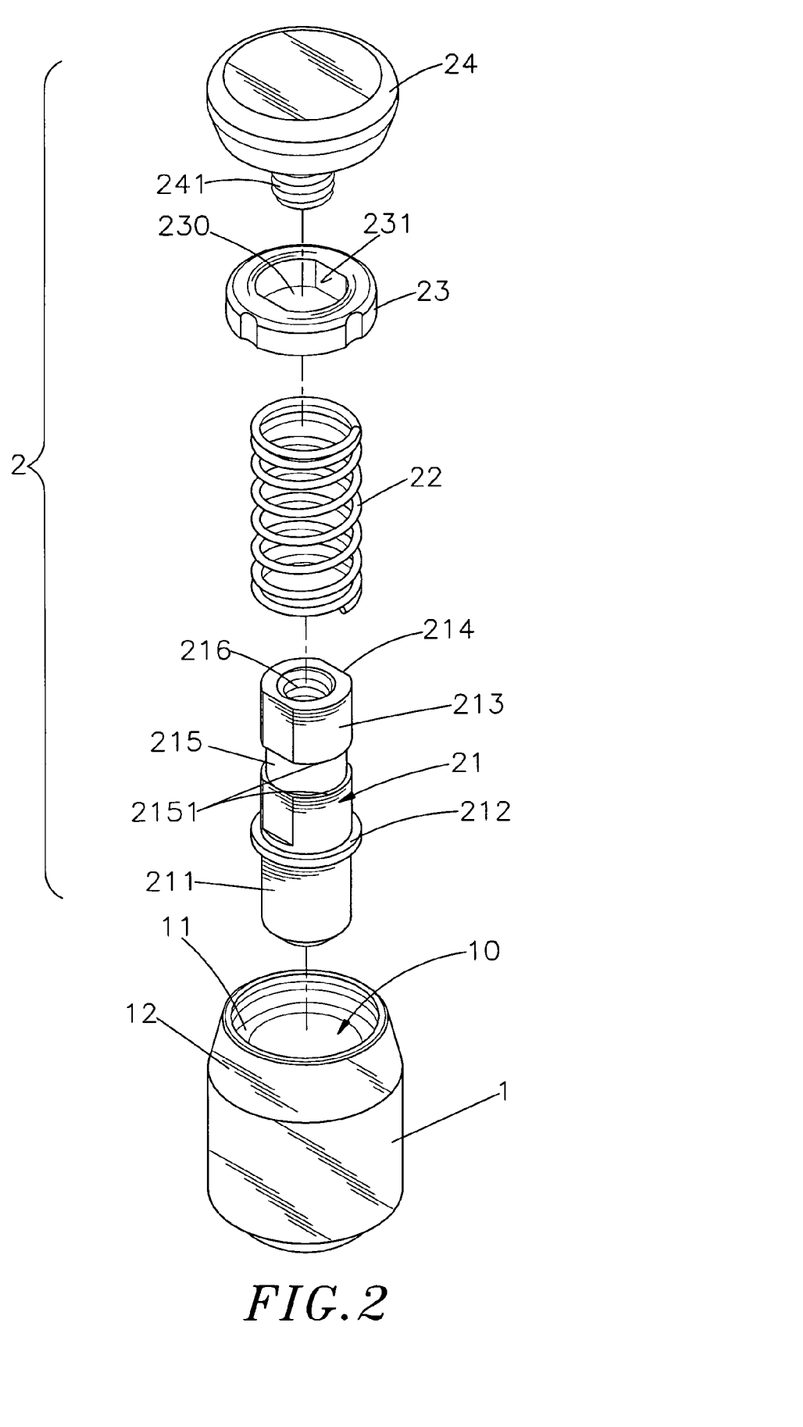
FIG. 2 is an exploded view of the floating fastener in accordance with the first embodiment of the present invention.
Figure 3:
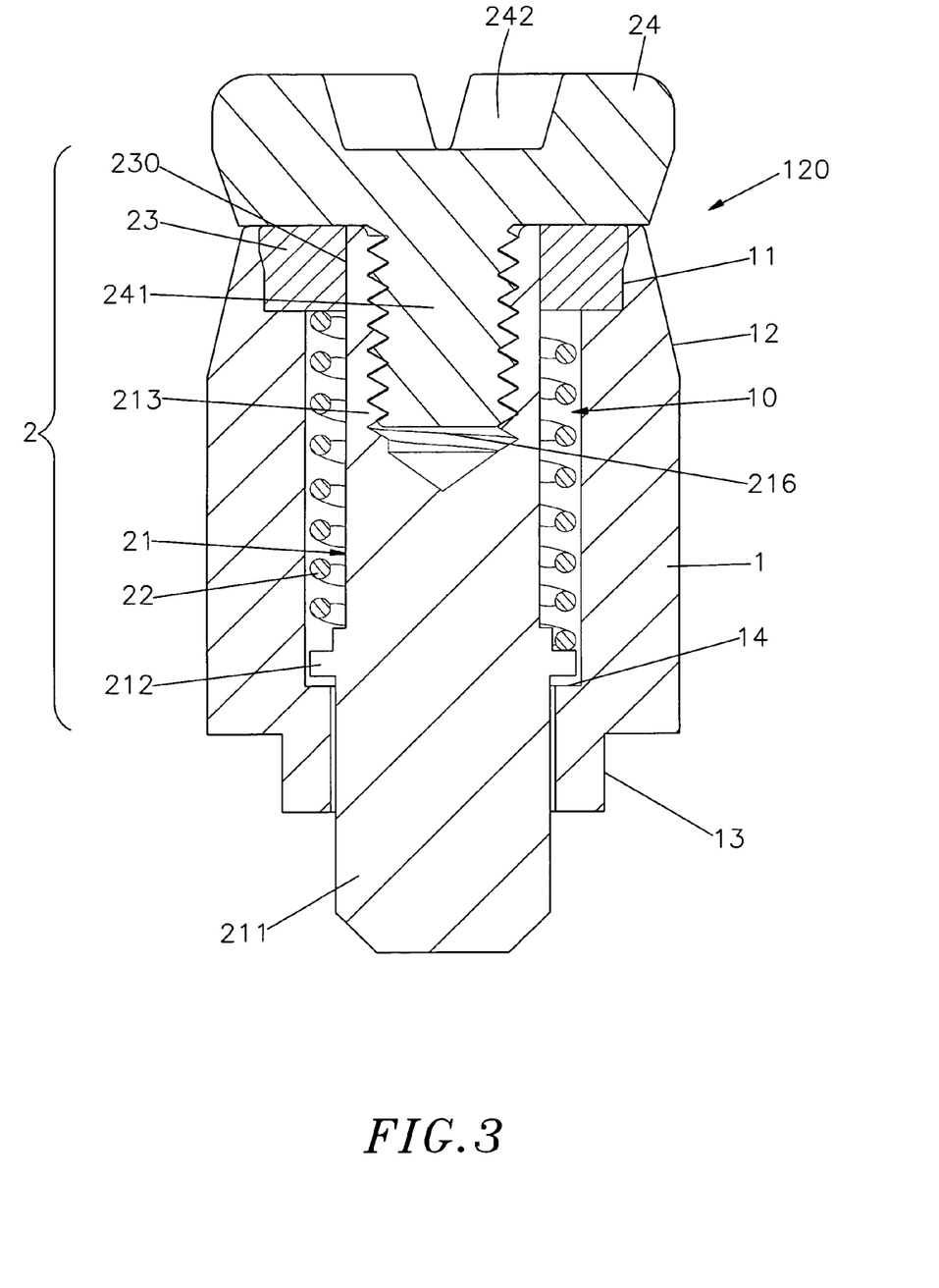
FIG. 3 is a sectional side view of the floating fastener in accordance with the first embodiment of the present invention.

Referring to FIGS. 1~3, a floating fastener in accordance with a first embodiment of the present invention is shown comprising a base member 1 and a locking rod set 2.

The base member 1 has a tapered end portion 12 located on one end thereof, namely, the top end, an accommodation chamber 11 surrounded by the tapered end portion 12, a tubular mounting neck 13 axially extended from an opposite end thereof, namely, the bottom end, an axial hole 10 axially defined therein in communication between the accommodation chamber 11 and the inside space of the tubular mounting neck 13, and a shoulder 14 located on the inside between the axial hole 10 and the tubular mounting neck 13. The tubular mounting neck 13 has an outer diameter smaller than the outer diameter of the periphery of the base member 1.

The locking rod set 2 includes a locking rod 21, a spring member 22, a limiter block 23 and a knob 24. The locking rod 21 has an elongated rod body 213, a locking tip 211 axially extended from one end of the elongated rod body 213, a stop flange 212 extending around the periphery between the elongated rod body 213 and the locking tip 211, two longitudinal cut planes 214 located on the periphery of the elongated rod body 213 at two opposite sides and extending to two distal ends of the elongated rod body 213, two arched surface portions 2151 located on the periphery of the elongated rod body 213 at two opposite sides and spaced by the longitudinal cut planes 214, an annular groove 215 extending around the periphery of the elongated rod body 213 on the middle across the arched surface portions 2151 and the longitudinal cut planes 214, and a screw hole 216 located on one end of the elongated rod body 213 remote from the locking tip 211.

The spring member 22 is sleeved onto the elongated rod body 213 and stopped at the stop flange 212.

The limiter block 23 has a constraint hole 230 cut through the top and bottom sides thereof for the passing of the elongated rod body 213 of the locking rod 21, and two cut planes 231 symmetrically disposed at two opposite sides inside the constraint hole 230. The two cut planes 231 of the limiter block 23 fit the longitudinal cut planes 214 of the locking rod 21. Thus, when the limiter block 23 is moved along the elongated rod body 213 of the locking rod 21 to the annular groove 215, the limiter block 23 can be rotated relative to the locking rod 21. When the limiter block 23 is moved away from the annular groove 215, the limiter block 23 is prohibited from rotation relative to the locking rod 21.

The knob 24 has a screw rod 241 located on the bottom side thereof for threading into the screw hole 216 of the locking rod 21.

When assembling the component parts of the floating fastener, insert the locking rod 21 into the axial hole 10 of the base member 1 to force the locking tip 211 of the locking rod 21 out of the tubular mounting neck 11 of the base member 1 and to stop the stop flange 212 against the shoulder 14, and then sleeve the spring member 22 onto the elongated rod body 213 of the locking rod 21, and then attach the limiter block 23 to the elongated rod body 213 of the locking rod 21 to keep the cut planes 231 of the limiter block 23 in contact with the longitudinal planes 214 of the locking rod 21 and to have the limiter block 23 be set in the accommodation chamber 11 of the base member 1, and then thread the screw rod 241 of the knob 24 into the screw hole 216 of the locking rod 21. At this time, the knob 24 is disposed outside the base member 1, and an inwardly curved gripping space 120 is defined around the tapered end portion 12 of the base member 1 and the periphery of the knob 24.

The constraint hole 230 of the limiter block 23 is an elliptical hole fitting the elliptical cross section of the elongated rod body 213 of the locking rod 21, and the two cut planes 231 are arranged in parallel relative to the major axis of the elliptical constraint hole 230. Thus, the elongated rod body 213 of the locking rod 21 can be axially slidably inserted through the constraint hole 230 of the limiter block 23 to keep the longitudinal cut planes 214 in contact with the cut planes 231 of the limiter block 23.

Figure 4:
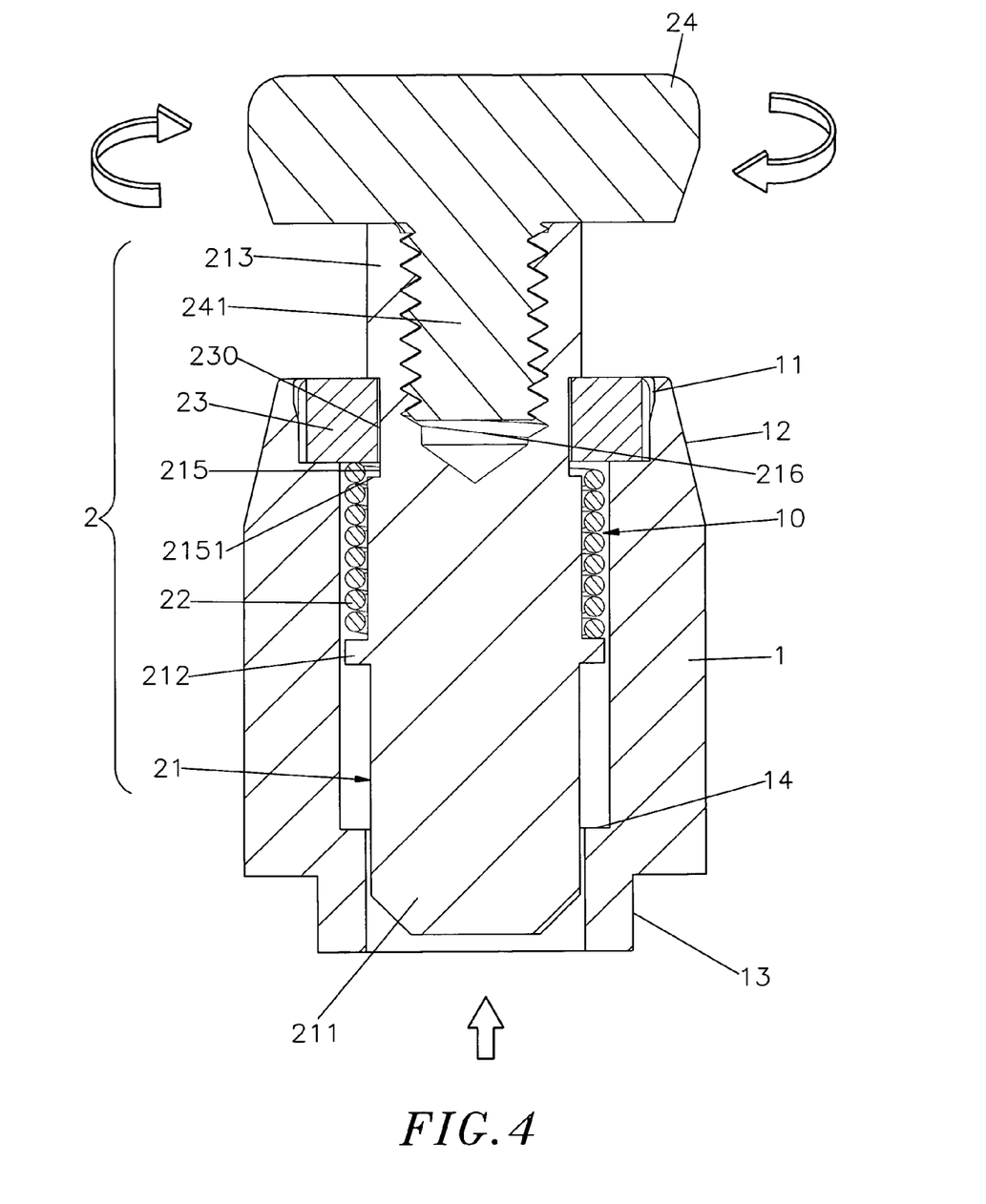
FIG. 4 is a schematic sectional view of the first embodiment of the present invention, illustrating the locking tip of the locking rod received inside the base member and the locking rod rotated with the knob from the released position to the constrained position.

Referring to FIG. 4 and FIGS. 2 and 3 again, when using the floating fastener, the user can attach the hand to the inwardly curved gripping space 120 to grip the knob 24 positively, and then pull the knob 24 outwardly away from the base member 1, carrying the elongated rod body 213 of the locking rod 21 out of the constraint hole 230 of the limiter block 23. When the annular groove 215 reaches the elevation of the constraint hole 230 of the limiter block 23 during outward sliding movement of the elongated rod body 213 relative to the limiter block 2, rotate the knob 24 through 90° angle to bias the longitudinal cut planes 214 of the locking rod 21 relative to the cut planes 231 of the limiter block 23 and to have the arched surface portions 2151 be stopped against the cut planes 231 of the limiter block 23, and therefore the locking rod 21 is stopped from further axial sliding movement relative to the base member 1. At this time, the locking tip 211 of the locking rod 21 is kept inside the tubular mounting neck 13 and axial hole 10 of the base member 1. Thus, the locking rod 21 is kept secured to the base member 1, avoiding missing.

Figure 5:
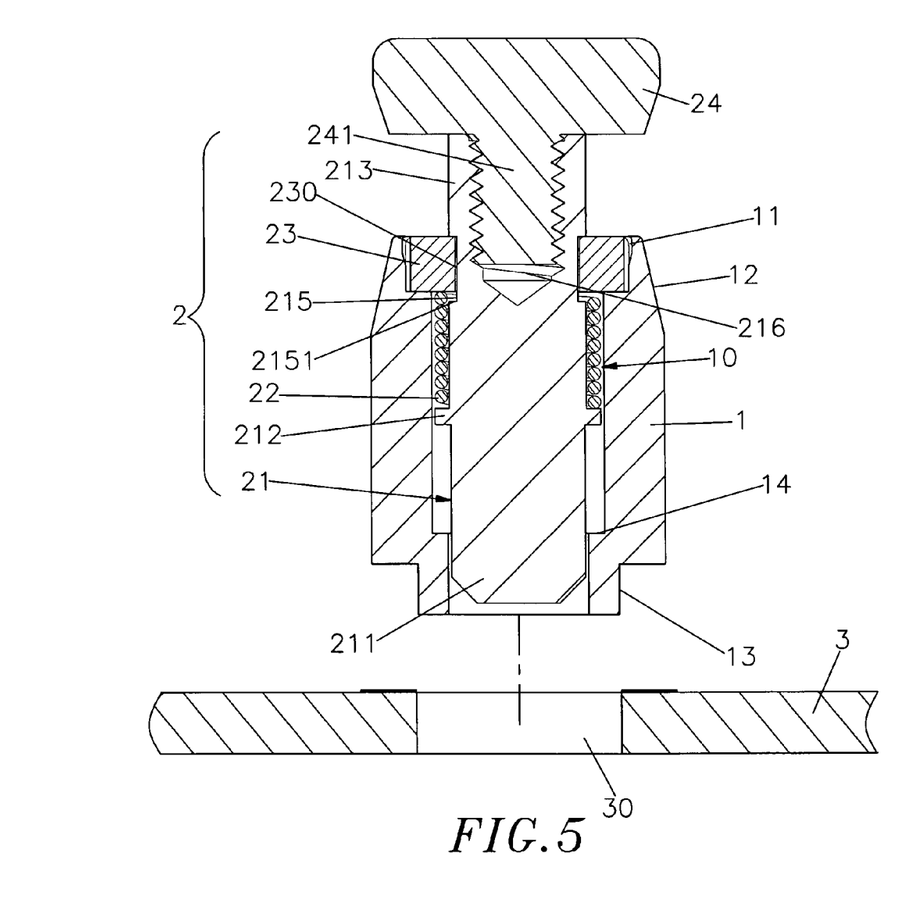
FIG. 5 is a sectional applied view of the first embodiment of the present invention illustrating the status of the floating fastener before installation of the base member in the first board member.
Figure 6:
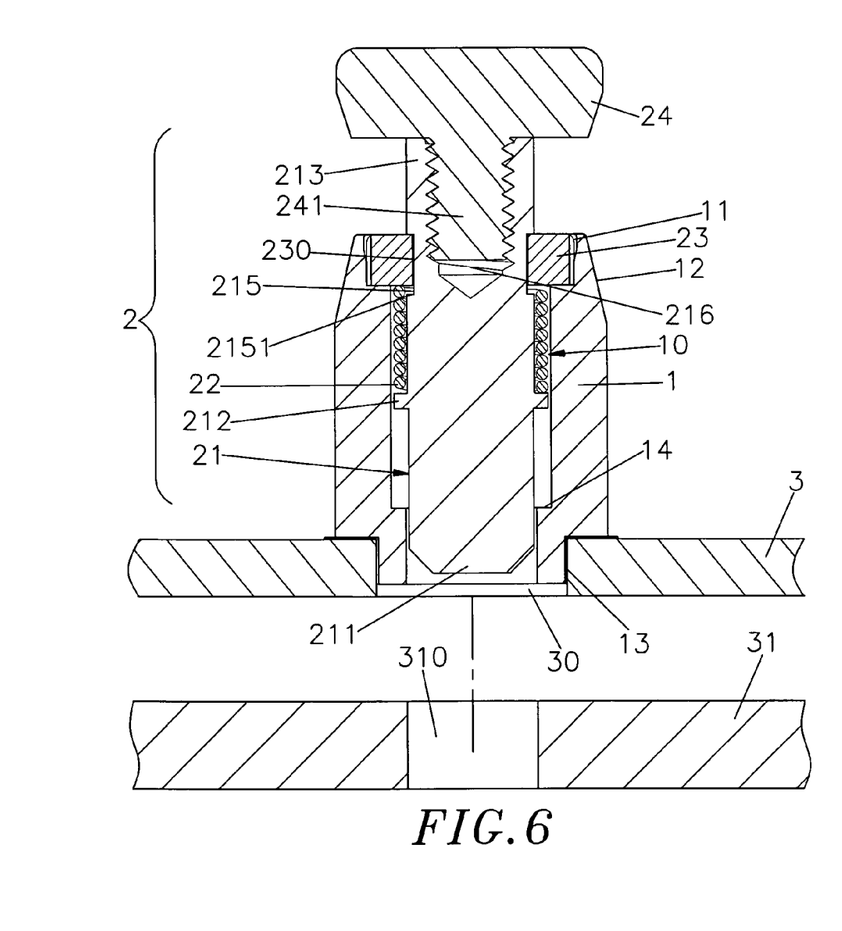
FIG. 6 is a sectional applied view of the first embodiment of the present invention illustrating the base member of the floating fastener installed in the first board member before connection to the second board member.
Figure 7:
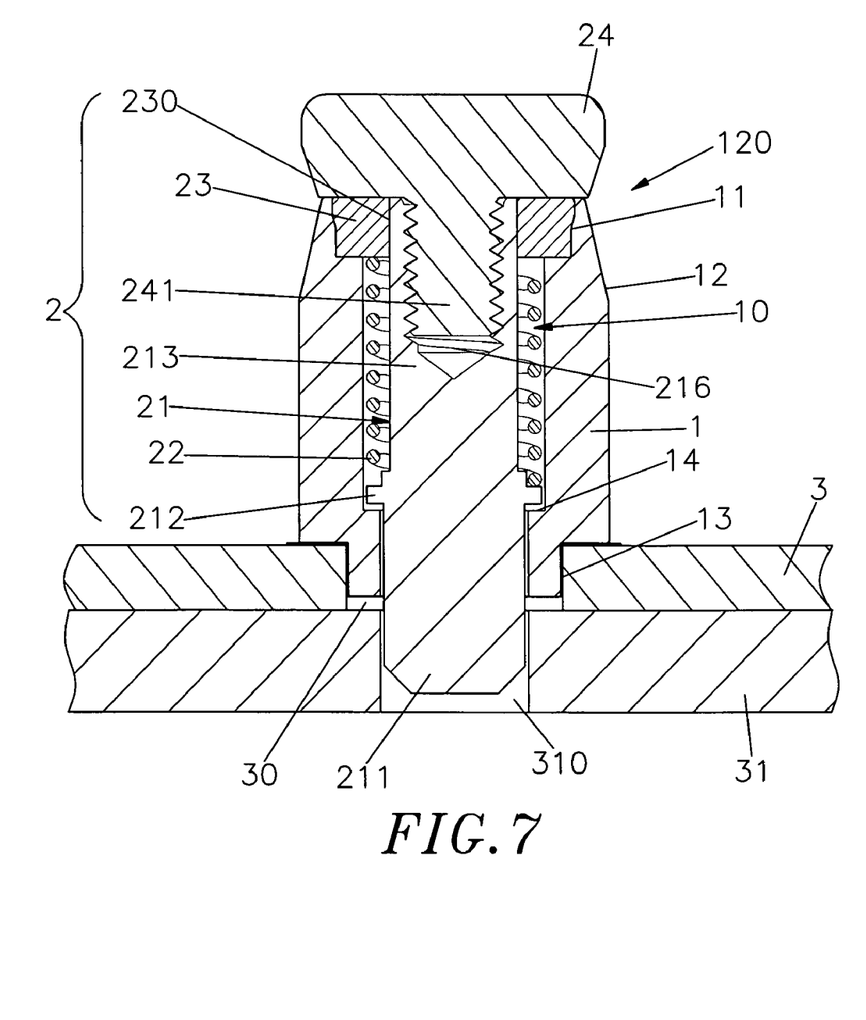
FIG. 7 corresponds to FIG. 6, illustrating the locking tip of the locking rod engaged into the retaining hole of the second board member.

Referring to FIGS. 5~7 and FIG. 2 again, the tubular mounting neck 13 of the base member 1 can be press-fitted into a mounting through hole 30 of a first board member 3 and affixed thereto with an adhesive or by means of a soldering technique. As the locking tip 211 of the locking rod 21 is kept inside the tubular mounting neck 13 and axial hole 10 of the base member 1, it does not interfere with the installation of the tubular mounting neck 13 of the base member 1 in the mounting through hole 30 of the first board member 3. When wishing to fasten the first board member 3 to a second board member 31 that has a retaining hole 310 corresponding to the mounting through hole 30 of the first board member 3, attach the first board member 3 to the second board member 31 to keep the mounting through hole 30 in axial alignment with the retaining hole 310, and then rotate the knob 24 through 90° angle to return the longitudinal cut planes 214 of the locking rod 21 to the position where the longitudinal cut planes 214 are kept in a parallel relationship relative to the cut planes 231 of the limiter block 23 and the arched surface portions 2151 are released from the constraint of the cut planes 231 of the limiter block 23. At this time, the spring member 22 is released from the constraint and imparts an outward pressure to the stop flange 212 of the locking rod 21 toward the shoulder 14, thereby forcing the locking tip 211 out of the tubular mounting neck 13 into the retaining hole 310 of the second board member 31 to lock the first board member 3 and the second board member 31.

When wishing to remove the first board member 3 from the second board member 31, pull the knob 24 of the locking rod set 2 outwardly away from the base member 1 to disengage the locking tip 211 of the locking rod 21 from the retaining hole 310 of the second board member 31 and then rotate the knob 24 through 90° angle to bias the longitudinal cut planes 214 of the locking rod 21 relative to the cut planes 231 of the limiter block 23 and to have the arched surface portions 2151 be stopped against the cut planes 231 of the limiter block 23, enabling the locking tip 211 of the locking rod 21 to be received inside the tubular mounting neck 13 and axial hole 10 of the base member 1. Thus, the user can remove the first board member 3 from the second board member 31 smoothly. By means of the aforesaid operation procedure, the user can fasten the first board member 3 to the second board member 31 or separate the first board member 3 from the second board member 31 easily without causing any trouble or missing of component parts.

Figure 8:
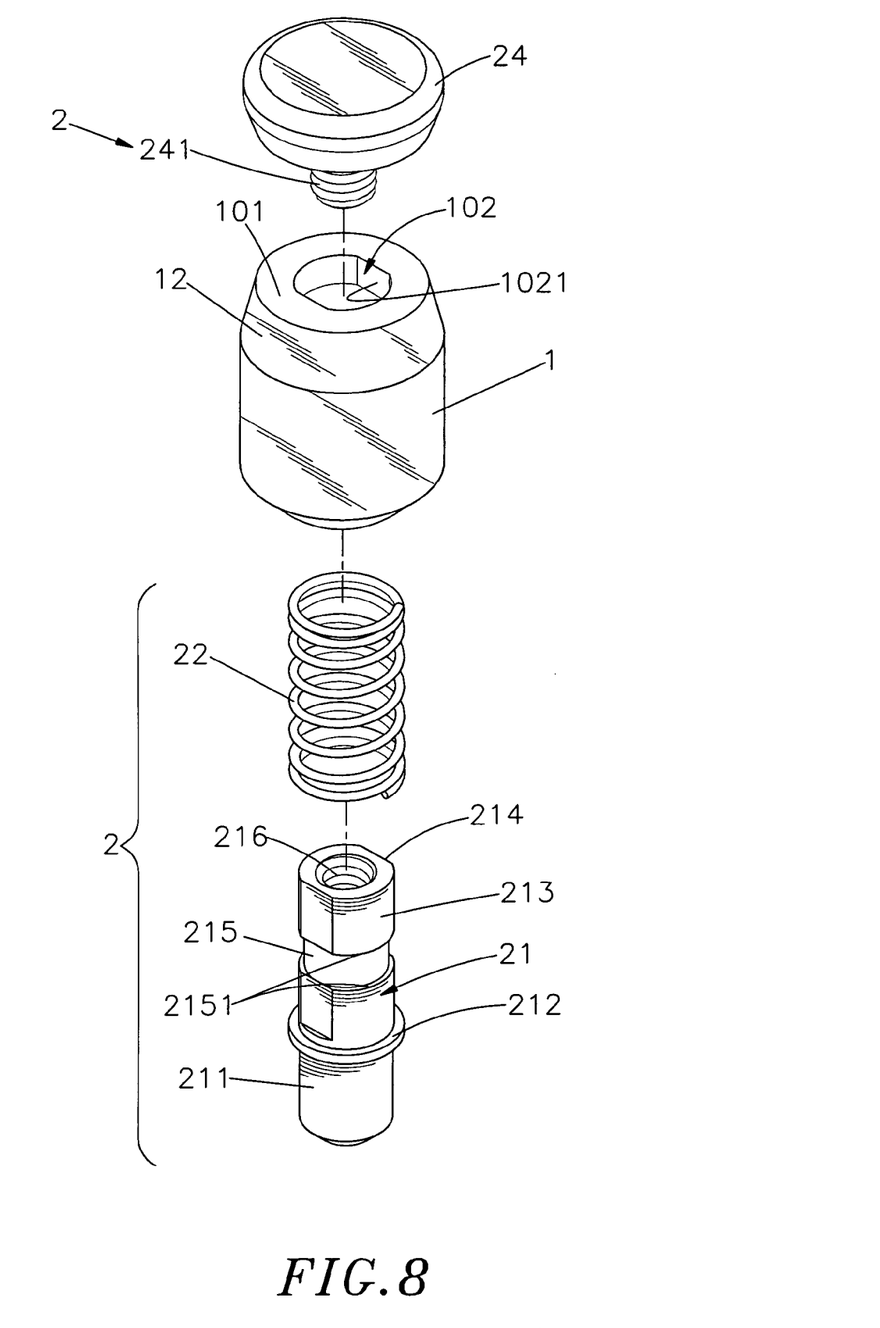
FIG. 8 is an exploded view of a floating fastener in accordance with a second embodiment of the present invention.
Figure 9:
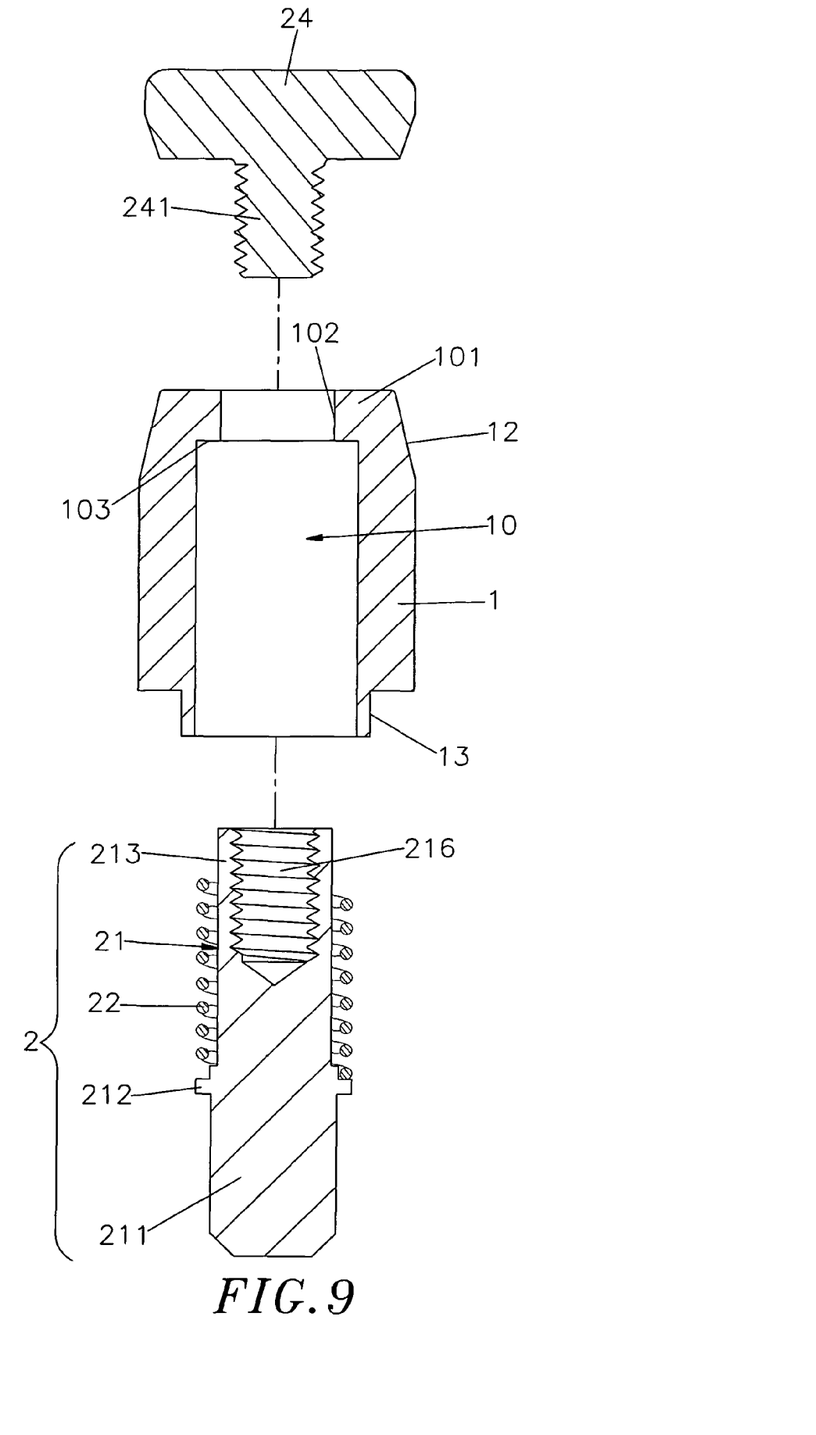
FIG. 9 is a sectional exploded view of the floating fastener in accordance with the second embodiment of the present invention.
Figure 10:
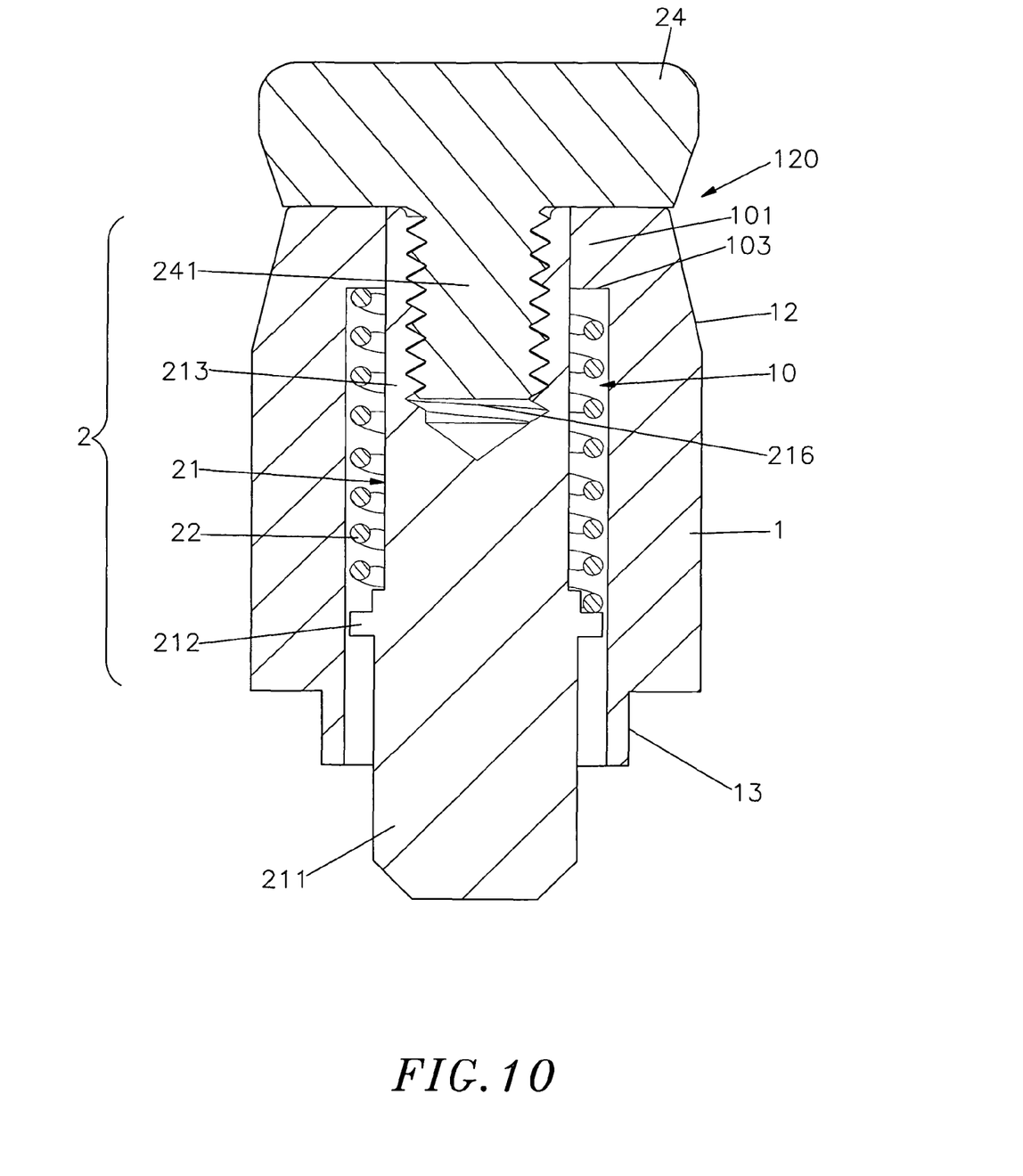
FIG. 10 is a sectional side assembly view of the floating fastener in accordance with the second embodiment of the present invention.

FIGS. 8~10 illustrate a floating fastener in accordance with a second embodiment of the present invention, comprising a base member 1 and a locking rod set 2. The base member 1 has a tapered end portion 12 located on one end thereof, namely, the top end, a constraint hole 102 cut through a transversely extending end wall 101 of the end portion 12, a tubular mounting neck 13 axially extended from an opposite end thereof, namely, the bottom end, an axial hole 10 axially extended from the constraint hole 102 through the tubular mounting neck 13. The locking rod set 2 includes a locking rod 21, a spring member 22, and a knob 24. The locking rod 21, the spring member 22 and the knob 24 are identical to like components of the aforesaid first embodiment.

When assembling the component parts of the floating fastener, sleeve the spring member 22 onto the elongated rod body 213 of the locking rod 21, and then insert the elongated rod body 213 of the locking rod 21 into the tubular mounting neck 13 and axial hole 10 of the base member 1 to let the spring member 22 be stopped between the stop flange 212 of the locking rod 21 and the end wall 101 of the end portion 12 of the base member 1 and to force a part of the elongated rod body 213 of the locking rod 21 through the constraint hole 102 and to keep the cut planes 231 of the limiter block 23 in contact with the longitudinal planes 214 of the locking rod 21, and then thread the screw rod 241 of the knob 24 into the screw hole 216 of the locking rod 21. At this time, the knob 24 is disposed outside the base member 1, and can be operated to move the locking rod 21 axially relative to the base member 1.

Further, the constraint hole 102 is an elliptical hole fitting the elliptical cross section of the elongated rod body 213 of the locking rod 21 and having a major axis and a minor axis, and the two cut planes 1021 are arranged in a parallel relationship relative to the major axis of the constraint hole 102 and in a perpendicular manner relative to the minor axis of the constraint hole 102. Thus, the elongated rod body 213 of the locking rod 21 can be axially slidably inserted through the constraint hole 230 of the limiter block 23 to keep the longitudinal cut planes 214 in contact with the cut planes 1021 of the constraint hole 102.

When the longitudinal cut planes 214 of the locking rod 21 are kept in contact with the cut planes 1021 of the constraint hole 102, the user can operate the knob 24 to the locking rod 21 axially relative to the base member 1. When the annular groove 215 reaches the elevation of the constraint hole 102 of the base member 1 during outward sliding movement of the locking rod 21 relative to the base member 1, rotate the knob 24 through 90° angle to bias the longitudinal cut planes 214 of the locking rod 21 relative to the cut planes 1021 of the constraint hole 102 and to have the arched surface portions 2151 be stopped against the cut planes 1021 of the constraint hole 102, and therefore the locking rod 21 is stopped from further axial sliding movement relative to the base member 1. At this time, the locking tip 211 of the locking rod 21 is kept inside the tubular mounting neck 13 and axial hole 10 of the base member 1, and the spring member 22 is compressed between the stop flange 212 of the locking rod 21 and a bottom edge 103 of the end wall 101 of the end portion 12 of the base member 1.

When rotating the knob 24 through further 90° angle, the longitudinal cut planes 214 of the locking rod 21 are biased to the position where the longitudinal cut planes 214 are kept in a parallel relationship relative to the cut planes 1021 of the constraint hole 102 and the arched surface portions 2151 are released from the constraint of the cut planes 1021 of the constraint hole 102. At this time, the spring member 22 is released from the constraint and imparts an outward pressure to the stop flange 212 of the locking rod 21 toward the shoulder 14, thereby forcing the locking tip 211 out of the tubular mounting neck 13.

The above described embodiments are simply examples of the invention but not intended as limitations of the invention. As stated above, the axial hole 10 of the base member 1 is adapted for the insertion of the locking rod 21 so that the locking tip 211 of the locking rod 21 can be moved in and out of the tubular mounting neck 13 of the base member 1. Further, the accommodation chamber 11 is adapted for holding the limiter block 23, enabling the elongated rod body 213 of the locking rod 21 to be axially slidably inserted through the constraint hole 230 of the limiter block 23. When the annular groove 215 of the locking rod 21 is moved to the elevation of the constraint hole 230, the locking rod 21 can be rotated relative to the limiter block 23 and the base member 1 between a constrained position where the locking rod 21 is prohibited from axial displacement relative to the base member 1 and a released position where the locking rod 21 is released from the constraint of the limiter block 23 and can be moved axially relative to the base member 1. After fixation of the tubular mounting neck 13 of the base member 1 to the mounting through hole 30 of the first board member 3, the locking rod 21 can be released from the constrained position and moved axially to force the locking tip 211 out of the tubular mounting neck 13 into the retaining hole 310 of the second board member 31, locking the first board member 3 and the second board member 31. As the locking rod 21 is slidably kept in the base member 1, the invention avoids missing of the locking rod 21 during mounting or dismounting of the floating fastener.

In conclusion, the invention provides a floating fastener, which has advantages and features as follows:

1. The locking rod 21 of the locking rod set 2 is axially slidably inserted through the constraint hole 230 of the limiter block 23 and the axial hole 10 of the base member 1, and can be rotated relative to the limiter block 23 and the base member 1, when the annular groove 215 of the locking rod 21 is moved to the elevation of the constraint hole 230, between a constrained position where the locking rod 21 is prohibited from axial displacement relative to the base member 1 and a released position where the locking rod 21 is released from the constraint of the limiter block 23 and can be moved axially relative to the base member 1.
2. When the floating fastener is assembled, the constraint hole 230 of the limiter block 23 does not allow the knob 24 or the stop flange 212 of the locking rod 21 to pass therethrough, and therefore the locking rod 21 is constantly kept in the axial hole 10 of the base member 1 and will not fall out of the base member 1, avoiding missing.

It is to be understood that the above-described embodiments of the invention are merely possible examples of implementations, merely set forth for a clear understanding of the principles of the invention, many modifications and enhancements may be made without departing from the spirit and scope of the invention. Accordingly, the invention is not to be limited except as by the appended claims.

What the invention claimed is:

1. A floating fastener, comprising:
   a base member having an accommodation chamber defined in one end thereof, a tubular mounting neck axially extended from an opposite end thereof for fastening to an external first board member, an axial hole axially defined therein in communication between said accommodation chamber and the inside space of said tubular mounting neck and a shoulder located on an inside wall thereof between said axial hole and said tubular mounting neck;
   a locking rod set mounted in said base member and adapted for locking said external first board member to an external second board member, said locking rod set comprising:
   a limiter block fixedly mounted in said accommodation chamber, said limiter block having an non-circular constraint hole cut through top and bottom sides thereof in axial alignment with said axial hole of said base member;
   a locking rod inserted through said axial hole of said base member and said non-circular constraint hole of said limiter block, said locking rod comprising an elongated rod body, said elongated rod body having a non-circular cross section fitting the configuration of the non-circular constraint hole of said limiter block, a locking tip axially extended from one end of said elongated rod body, a stop flange extending around the periphery thereof between said elongated rod body and said locking tip and stoppable at said shoulder inside said base member, and an annular groove extending around a middle part of the periphery of said elongated rod body;
   a spring member sleeved onto said elongated rod body of said locking rod and stopped between said stop flange of said locking rod and said limiter block; and
   a knob fastened to one end of said elongated rod body of said locking rod and disposed outside said base member and operable to move said locking rod axially relative to said base member, and to rotate said locking rod, when said locking rod is moved with said knob to the elevation where said annular groove of said locking rod is kept in said non-circular constraint hole of said limiter block, between a constrained position where said locking tip of said locking rod is received inside said base member and said locking rod is stopped by said limiter block from axial movement relative to said base member and a released position where said locking rod is movable axially relative to said base member.

2. The floating fastener as claimed in claim 1, wherein said tubular mounting neck has an outer diameter smaller than said base member.

3. The floating fastener as claimed in claim 1, wherein said base member comprises a tapered end portion surrounding said accommodation chamber.

4. The floating fastener as claimed in claim 1, wherein said locking rod comprises a screw hole located on one end of said elongated rod body remote from said locking tip; said knob comprises a screw rod threaded into said screw hole of said locking rod.

5. The floating fastener as claimed in claim 1, wherein said locking rod comprises two longitudinal cut planes located on the periphery of said elongated rod body at two opposite sides, and two arched surface portions located on the periphery of the elongated rod body at two opposite sides and spaced by said longitudinal cut planes; said annular groove of said locking rod extends around the periphery of said elongated rod body on a middle thereof across said arched surface portions and said longitudinal cut planes.

6. The floating fastener as claimed in claim 1, wherein said non-circular constraint hole of said limiter block is an elliptical hole having a major axis and a minor axis, and two cut planes disposed at two opposite sides in a perpendicular manner relative to said minor axis and in a parallel relationship relative to said major axis and fitting the longitudinal cut planes of said locking rod.

7. A floating fastener, comprising:
   a base member, said base member comprising an end wall located on one end thereof, a non-circular constraint hole cutting through said end wall, a tubular mounting neck axially extended from an opposite end thereof for fastening to an external first board member, an axial hole axially defined therein in communication between said non-circular constraint hole and the inside space of said tubular mounting neck and a shoulder located on an inside wall thereof between said axial hole and said tubular mounting neck;
   a locking rod set mounted in said base member and adapted for locking said external first board member to an external second board member, said locking rod set comprising:
   a locking rod inserted through said axial hole and said non-circular constraint hole of said base member, said locking rod comprising an elongated rod body, said elongated rod body having a non-circular cross section fitting the configuration of said non-circular constraint hole of said base member, a locking tip axially extended from one end of said elongated rod body, a stop flange extending around the periphery thereof between said elongated rod body and said locking tip and stoppable at said shoulder inside said base member, and an annular groove extending around a middle part of the periphery of said elongated rod body;
   a spring member sleeved onto said elongated rod body of said locking rod and stopped between said stop flange of said locking rod and said end wall of said base member; and
   a knob fastened to one end of said elongated rod body of said locking rod and disposed outside said base member and operable to move said locking rod axially relative to said base member, and to rotate said locking rod, when said annular groove of said locking rod is kept in said non-circular constraint hole of said base member, between a constrained position where said locking tip of said locking rod is received inside said base member and said locking rod is stopped by said end wall from axial movement relative to said base member and a released position where said locking rod is movable axially relative to said base member.

8. The floating fastener as claimed in claim 7, wherein said non-circular constraint hole is an elliptical hole having a major axis and a minor axis, and two cut planes disposed at two opposite sides in a perpendicular manner relative to said minor axis and in a parallel relationship relative to said major axis.

9. The floating fastener as claimed in claim 8, wherein said locking rod comprises two longitudinal cut planes located on the periphery of said elongated rod body at two opposite sides corresponding to the two cut planes of said non-circular constraint hole, and two arched surface portions located on the periphery of the elongated rod body at two opposite sides and spaced by said longitudinal cut planes; said annular groove of said locking rod extends around the periphery of said elongated rod body on a middle thereof across said arched surface portions and said longitudinal cut planes.

* * * * *